United States Patent
Lee et al.

(10) Patent No.: US 9,465,493 B2
(45) Date of Patent: Oct. 11, 2016

(54) TOUCHSCREEN DEVICE AND METHOD OF SENSING TOUCH

(71) Applicant: SAMSUNG ELECTRO-MECHANICS CO., LTD., Suwon (KR)

(72) Inventors: Hyun Suk Lee, Suwon (KR); Tae Hyeon Kwon, Suwon (KR); Ray Amiya, Suwon (KR); Tah Joon Park, Suwon (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 303 days.

(21) Appl. No.: 14/206,299

(22) Filed: Mar. 12, 2014

(65) Prior Publication Data

US 2015/0185899 A1 Jul. 2, 2015

(30) Foreign Application Priority Data

Dec. 27, 2013 (KR) ........................ 10-2013-0166121

(51) Int. Cl.
*G06F 3/041* (2006.01)
*G06F 3/044* (2006.01)

(52) U.S. Cl.
CPC ............. *G06F 3/044* (2013.01); *G06F 3/0416* (2013.01)

(58) Field of Classification Search
CPC .... G06F 3/044; G06F 3/0418; G06F 3/0416; G06F 3/041; G06F 2203/04104; G06F 3/04886; G06F 2203/04106; G06F 3/03545; G06F 3/03547; G06F 21/316; G06F 2200/1637; G06F 2203/04112; G06F 3/0202
USPC ......................................... 345/173, 174, 175
See application file for complete search history.

(56) References Cited

U.S. PATENT DOCUMENTS 8,436,833 B2 * 5/2013 King ..................... G06F 3/0421
345/175
8,982,091 B1 * 3/2015 Mohindra ............... G06F 3/044
345/173

FOREIGN PATENT DOCUMENTS

JP 2013-149223 8/2013

* cited by examiner

*Primary Examiner* — Duc Dinh
(74) *Attorney, Agent, or Firm* — NSIP Law

(57) ABSTRACT

There are provided a touchscreen device and a method of sensing a touch. The touchscreen device includes: a panel unit including a plurality of first electrodes and a plurality of second electrodes; a driving circuit unit simultaneously applying driving signals to M first electrodes among the first electrodes, where M is a natural number equal to or greater than two; a sensing circuit unit detecting capacitance generated in intersections between the first electrodes and the second electrodes so as to output sensing signals; and an operation unit determining whether a touch has occurred, based on the sensing signals.

26 Claims, 9 Drawing Sheets

| t \ T | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 1 | 1 | 1 | -1 | -1 | -1 | 1 | -1 | -1 | 1 | 1 | -1 | 1 | -1 | 1 | 1 | 1 |
| 2 | 1 | -1 | -1 | -1 | 1 | -1 | -1 | 1 | 1 | -1 | 1 | -1 | 1 | 1 | 1 | 1 |
| 3 | 1 | -1 | -1 | 1 | -1 | -1 | 1 | 1 | -1 | 1 | -1 | 1 | 1 | 1 | 1 | -1 |
| 4 | 1 | -1 | 1 | -1 | -1 | 1 | 1 | -1 | 1 | -1 | 1 | 1 | 1 | 1 | -1 | -1 |
| 5 | 1 | 1 | -1 | -1 | 1 | 1 | -1 | 1 | -1 | 1 | 1 | 1 | -1 | -1 | -1 | -1 |
| 6 | 1 | -1 | -1 | 1 | 1 | -1 | 1 | -1 | 1 | 1 | 1 | -1 | -1 | -1 | -1 | 1 |
| 7 | 1 | -1 | 1 | 1 | -1 | 1 | -1 | 1 | 1 | 1 | 1 | -1 | -1 | -1 | 1 | -1 |
| 8 | 1 | 1 | 1 | -1 | 1 | -1 | 1 | 1 | 1 | 1 | -1 | -1 | -1 | 1 | -1 | -1 |
| 9 | -1 | 1 | -1 | 1 | -1 | 1 | 1 | 1 | 1 | -1 | -1 | -1 | 1 | -1 | -1 | 1 |
| 10 | -1 | -1 | 1 | -1 | 1 | 1 | 1 | 1 | -1 | -1 | -1 | 1 | -1 | -1 | 1 | 1 |
| 11 | -1 | 1 | -1 | 1 | 1 | 1 | 1 | -1 | -1 | -1 | 1 | -1 | -1 | 1 | 1 | -1 |
| 12 | -1 | -1 | 1 | 1 | 1 | 1 | -1 | -1 | -1 | 1 | -1 | -1 | 1 | 1 | -1 | 1 |
| 13 | -1 | 1 | 1 | 1 | 1 | -1 | -1 | -1 | 1 | -1 | -1 | 1 | 1 | -1 | 1 | -1 |
| 14 | -1 | 1 | 1 | 1 | -1 | -1 | -1 | 1 | -1 | -1 | 1 | 1 | -1 | 1 | -1 | 1 |
| 15 | -1 | 1 | 1 | -1 | -1 | -1 | 1 | -1 | -1 | 1 | 1 | -1 | 1 | -1 | 1 | 1 |

FIG. 6

|    | 1  | 2  | 3  | 4  | 5  | 6  | 7  | 8  | 9  | 10 | 11 | 12 | 13 | 14 | 15 |
|----|----|----|----|----|----|----|----|----|----|----|----|----|----|----|----|
| 1  | 16 | 0  | 0  | 0  | 0  | 0  | 0  | 0  | -2 | -2 | -2 | -2 | -2 | -2 | -2 |
| 2  | 0  | 16 | 0  | 0  | 0  | 0  | 0  | 0  | -2 | -2 | -2 | -2 | -2 | -2 | -2 |
| 3  | 0  | 0  | 16 | 0  | 0  | 0  | 0  | 0  | -2 | -2 | -2 | -2 | -2 | -2 | -2 |
| 4  | 0  | 0  | 0  | 16 | 0  | 0  | 0  | 0  | -2 | -2 | -2 | -2 | -2 | -2 | -2 |
| 5  | 0  | 0  | 0  | 0  | 16 | 0  | 0  | 0  | -2 | -2 | -2 | -2 | -2 | -2 | -2 |
| 6  | 0  | 0  | 0  | 0  | 0  | 16 | 0  | 0  | -2 | -2 | -2 | -2 | -2 | -2 | -2 |
| 7  | 0  | 0  | 0  | 0  | 0  | 0  | 16 | 0  | -2 | -2 | -2 | -2 | -2 | -2 | -2 |
| 8  | 0  | 0  | 0  | 0  | 0  | 0  | 0  | 16 | -2 | -2 | -2 | -2 | -2 | -2 | -2 |
| 9  | -2 | -2 | -2 | -2 | -2 | -2 | -2 | -2 | 16 | 0  | 0  | 0  | 0  | 0  | 0  |
| 10 | -2 | -2 | -2 | -2 | -2 | -2 | -2 | -2 | 0  | 16 | 0  | 0  | 0  | 0  | 0  |
| 11 | -2 | -2 | -2 | -2 | -2 | -2 | -2 | -2 | 0  | 0  | 16 | 0  | 0  | 0  | 0  |
| 12 | -2 | -2 | -2 | -2 | -2 | -2 | -2 | -2 | 0  | 0  | 0  | 16 | 0  | 0  | 0  |
| 13 | -2 | -2 | -2 | -2 | -2 | -2 | -2 | -2 | 0  | 0  | 0  | 0  | 16 | 0  | 0  |
| 14 | -2 | -2 | -2 | -2 | -2 | -2 | -2 | -2 | 0  | 0  | 0  | 0  | 0  | 16 | 0  |
| 15 | -2 | -2 | -2 | -2 | -2 | -2 | -2 | -2 | 0  | 0  | 0  | 0  | 0  | 0  | 16 |

TOUCHSCREEN DEVICE AND METHOD OF SENSING TOUCH

CROSS-REFERENCE TO RELATED APPLICATION

This application claims the benefit of Korean Patent Application No. 10-2013-0166121, filed on Dec. 27, 2013, with the Korean Intellectual Property Office, the disclosure of which is incorporated herein by reference.

BACKGROUND

The present disclosure relates to a touchscreen device and a method of sensing touches.

A touchscreen device, such as a touchscreen and a touch pad, is a data input device attached to a display device to provide an intuitive user interface, and has recently been widely used in various electronic devices such as cellular phones, personal digital assistants (PDA) and navigation devices. Particularly, demand for smartphones has recently increased, touchscreens have been increasingly employed therein as devices providing users with various data input methods in a limited form factor.

Touchscreens used in portable devices may be mainly divided into resistive type touchscreens and capacitive type touchscreens, depending on the manner in which a touch is sensed therein. Among these, capacitive type touchscreens have advantages of a relatively long lifespan and ease of implementation of various data input schemes allowing for a variety of gestures to be used therefor, and thus have been increasingly employed. to The implementation of a multi-touch interface is especially easy with capacitive type touchscreens, as compared to resistive type touchscreen, and thus capacitive type touchscreens are widely used in smartphones and the like.

The capacitive type touchscreen includes a plurality of electrodes having a predetermined pattern and the electrodes define a plurality of nodes in which changes in capacitance are generated by touches. In the plurality of nodes arranged on a two-dimensional plane, changes in self-capacitance or in mutual-capacitance are generated by a touch, and coordinates of the touch may be calculated by applying, for example, a weighted average calculation method to the changes in capacitance generated in the plurality of nodes.

Recently, touchscreen devices have been employed in laptop computers, TVs and the like, devices having large screens, in addition to small mobile devices. As the size of the touchscreen devices is increased, the number and size of electrodes therein are also increased. Accordingly, when driving signals are sequentially applied to a plurality of electrodes, driving time is increased, proportionally to the increased number of electrodes, and capacitance is increased, proportionally to the increased size of the electrodes, so that the time for charging voltage, i.e., the driving time is increased.

RELATED ART DOCUMENT (Patent Document 1) Japanese Patent Laid-Open Publication No. 2013-149223

SUMMARY

An aspect of the present disclosure may provide a touchscreen device and a method of sensing touches in which elements in first to (fix(M/2)+1) rows of a first column are 1s, elements in (fix(M/2)+2) to $M^{th}$ rows of the first column are −1s, and elements in the second to $N^{th}$ columns of first to $M^{th}$ rows may apply driving signals generated according to a matrix created according to a PN code to M driving electrodes among a plurality of driving electrodes.

According to an aspect of the present disclosure, a touchscreen device may include: a panel unit including a plurality of first electrodes and a plurality of second electrodes; a driving circuit unit simultaneously applying driving signals to M first electrodes among the first electrodes, where M is a natural number equal to or greater than two; a sensing circuit unit detecting capacitance generated in intersections between the first electrodes and the second electrodes so as to output sensing signals; and an operation unit determining whether a touch has occurred, based on the sensing signals, wherein the driving circuit unit generates the driving signals according to an M by N matrix, where N is a natural number equal to or greater than two, wherein elements in first to (fix(M/2)+1) rows of a first column are 1s, and elements in (fix(M/2)+2) to $M^{th}$ rows of the first column are −1s, wherein elements in second to $N^{th}$ columns of first to $M^{th}$ rows are created according to at least one of a pseudo noise (PN) code and a Walsh code, where the expression fix(M/2) is a function that drops the portion of the quotient of M/2 to the right of the decimal point, i.e., rounds down M/2 to the nearest integer by truncating any fractional portion of M/2.

The relationship N=M+1 may be met.

The elements in the second to $N^{th}$ columns of the first row of the matrix may be created according to a PN code, and the elements in the second to $N^{th}$ columns of the second to $M^{th}$ rows of the matrix may be created by shifting the elements in the second to $N^{th}$ columns of the first row of the matrix by one bit for every row.

The elements in the second to $N^{th}$ columns of the first to $M^{th}$ rows of the matrix may be equal to elements of a Hadamard matrix created according to a Walsh code.

The driving circuit unit may simultaneously apply driving signals generated according to M rows of the matrix to M first electrodes among the first electrodes The driving circuit unit may apply driving signals generated according to N columns of the matrix at each of N timings.

The sensing circuit unit may output the sensing signals by $$Sk=\Sigma_{t=1}^{m} Ct,k*Dt$$

where Sk denotes a sensing signal, Ct,k denotes capacitance generated in intersections between first electrodes Xt and second electrodes Yk, and Dt denotes a driving signal applied to first electrodes Xt.

The operation unit may determine whether a touch has occurred, based on correlation values calculated by performing a correlation operation on the sensing signals acquired during a single period of the driving signals and the matrix.

The operation unit may correct a cross correlation values existing in the correlation values by multiplying the sensing signals acquired during a single period of the driving signals by a column vector.

The column vector may include a first column vector and a second column vector of (M+1) rows, wherein all of elements in the first column vector are 1, an element in a first row of the second column vector is −1, and elements in the rest of rows of the second column vector are 1.

The operation unit may calculate a first correction value by multiplying sensing signals obtained during a single period of the driving signals by the first column vector and may calculate a second correction value by multiplying the sensing signals obtained during a single period of the driving signals by the second column vector.

The operation unit may correct the cross correlation values existing in the correlation values according to first and second correction values.

The driving circuit unit may apply positive driving voltage when the elements in the matrix are 1 and may generate negative driving voltage when the elements in the matrix are −1.

According to another aspect of the present disclosure, a method of sensing a touch may include: simultaneously applying driving signals to M first electrodes among the first electrodes, where M is a natural number equal to or greater than two; obtaining sensing signals by detecting capacitance generated in intersections between the first electrodes and second electrodes; and determining whether a touch has occurred by calculating correlation values between the sensing signals and the driving signals, wherein the applying of the driving signals includes applying the driving signals generated according to an M by N matrix, where N is a natural number equal to or greater than two, wherein elements in first to (fix(M/2)+1) rows of a first column are 1s, and elements in (fix(M/2)+2) to $M^{th}$ rows of the first column are −1s, wherein elements in second to $N^{th}$ columns of first to $M^{th}$ rows are created according to at least one of a PN code and a Walsh code, where the expression fix(M/2) is a function that drops the portion of the quotient of M/2 to the right of the decimal point, i.e., rounds down M/2 to the nearest integer by truncating any fractional portion of M/2.

The relationship N=M+1 may be met.

The elements in the second to $N^{th}$ columns of the first row of the matrix may be created according to a PN code, and the elements in the second to $N^{th}$ columns of the second to $M^{th}$ rows of the matrix may be created by shifting the elements in the second to $N^{th}$ columns of the first row of the matrix by one bit for every row.

The elements in the second to $N^{th}$ columns of the first to $M^{th}$ rows of the matrix may be equal to elements of a Hadamard matrix created according to a Walsh code.

The applying of the driving signals may include simultaneously applying driving signals generated according to M rows of the matrix to M first electrodes among the first electrodes.

The applying of the driving signals may include applying driving signals generated according to N columns of the matrix at each of N timings.

The sensing circuit unit may output the sensing signals by $$Sk=\Sigma_{t=1}^{m}Ct,k*Dt$$

where Sk denotes a sensing signal, Ct,k denotes capacitance generated in intersections between first electrodes Xt and second electrodes Yk, and Dt denotes a driving signal applied to first electrodes Xt.

The determining whether a touch has occurred may include determining whether a touch has occurred, based on correlation values calculated by performing a correlation operation on the sensing signals acquired during a single period of the driving signals and the matrix.

The determining whether a touch has occurred may include correcting a cross correlation values existing in the correlation values by multiplying the sensing signals acquired during a single period of the driving signals by a column vector.

The column vector may include a first column vector and a second column vector of (M+1) rows, wherein all of elements in the first column vector are 1, an element in a first row of the second column vector is −1, and elements in the rest of rows of the second column vector are 1.

The determining whether a touch has occurred may include calculating a first correction value by multiplying sensing signals obtained during a single period of the driving signals by the first column vector and calculating a second correction value by multiplying the sensing signals obtained during a single period of the driving signals by the second column vector.

The determining whether a touch has occurred may include correcting the cross correlation values existing in the correlation values according to first and second correction values.

The applying of the driving signals may include applying positive driving voltage when the elements in the matrix are 1 and may generate negative driving voltage when the elements in the matrix are −1.

BRIEF DESCRIPTION OF DRAWINGS

The above and other aspects, features and other advantages of the present disclosure will be more clearly understood from the following detailed description taken in conjunction with the accompanying drawings, in which:

FIGS. 6 through 9 are diagrams for illustrating a method of sensing a touch.

DETAILED DESCRIPTION

Figure 1:
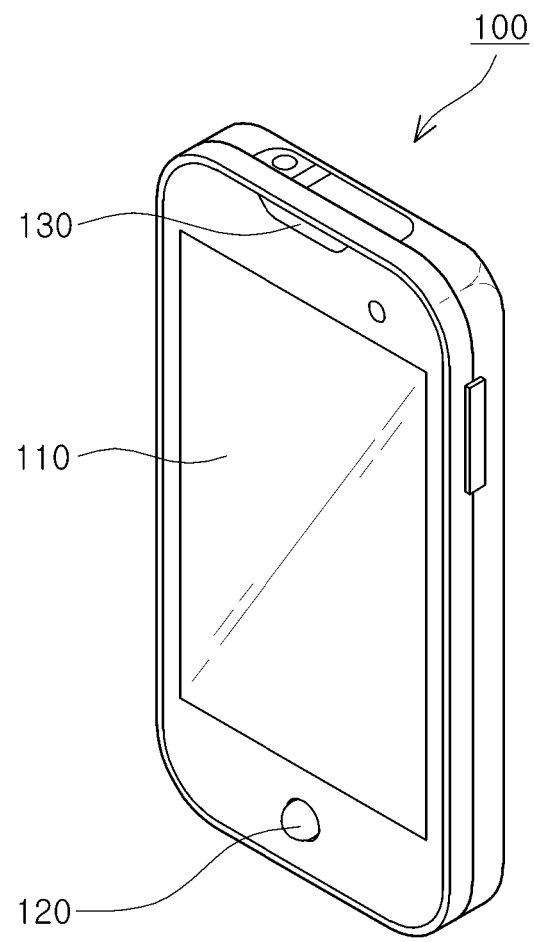
FIG. 1 is a perspective view illustrating an appearance of an electronic device including a touchscreen device according to an exemplary embodiment of the present disclosure.

Hereinafter, embodiments of the present disclosure will be described in detail with reference to the accompanying drawings. The disclosure may, however, be embodied in many different forms and should not be construed as being limited to the embodiments set forth herein. Rather, these embodiments are provided so that this disclosure will be thorough and complete, and will fully convey the scope of the disclosure to those skilled in the art. In the drawings, the shapes and dimensions of elements may be exaggerated for clarity, and the same reference numerals will be used throughout to designate the same or like elements.

FIG. 1 is a perspective view illustrating an appearance of an electronic device including a touchscreen device according to an exemplary embodiment of the present disclosure.

Referring to FIG. 1, the electronic device 100 according to the present embodiment may include a display device 110 outputting images via a screen, an input unit 120, an audio unit 130 outputting sound, and a touch sensing device integrated with the display device 110.

As illustrated in FIG. 1, typically in mobile devices, the touch sensing device is integrated with the display device, and should have sufficiently high light transmissivity to allow images displayed on the display device screen to be seen therethrough. Therefore, the touch sensing device may be implemented by forming a sensing electrode using a transparent and electrically conductive material such as indium tin oxide (ITO), indium zinc oxide (IZO), zinc oxide (ZnO), carbon nanotubes (CNT), or graphene on a base substrate formed of a transparent film material such as polyethylene terephthalate (PET), polycarbonate (PC), polyethersulfone (PES), polyimide (PI), polymethylmethacrylate (PMMA), or the like. In addition, the sensing electrode may be implemented as a fine conductor line formed of one of Ag, Al, Cr, Ni, Mo and Cu or an alloy thereof.

The display device may include a wiring pattern disposed in a bezel region thereof, in which the wiring pattern is connected to the sensing electrode formed of the transparent and conductive material. Since the wiring pattern is hidden by the bezel region, it may be formed of a metal such as silver (Ag) and copper (Cu).

Since it is assumed that the touch sensing device according to the exemplary embodiment of the present disclosure is operated in a capacitive manner, the touchscreen device may include a plurality of electrodes having a predetermined pattern. Further, the touchscreen device may include a capacitance sensing circuit to sense changes in capacitance generated in the plurality of electrodes, an analog-digital converting circuit to convert an output signal from the capacitance sensing circuit into a digital value, and a calculating circuit to determine if a touch has occurred, based on the converted digital value data.

Figure 2:
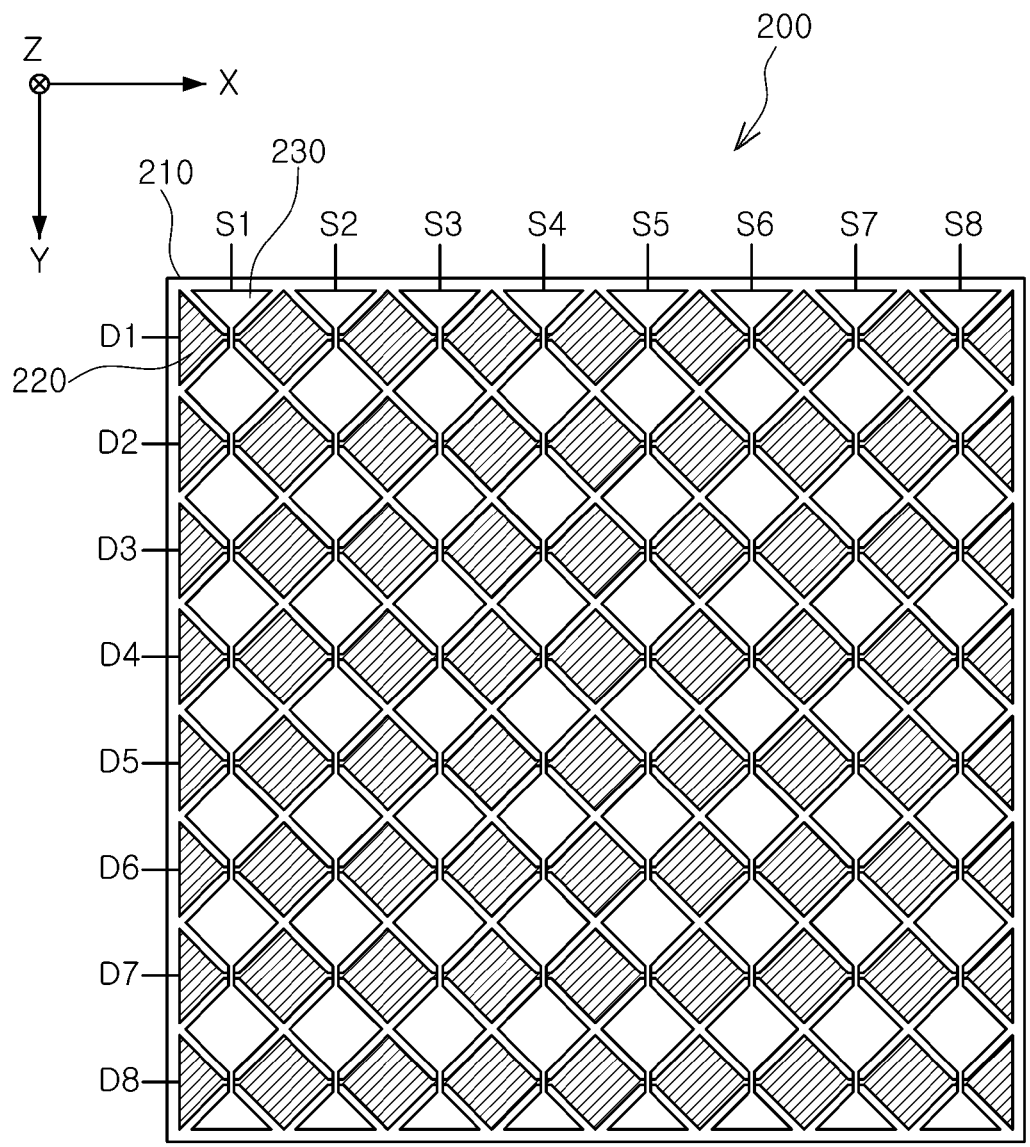
FIG. 2 is a view of a panel unit included in a touchscreen device according to an exemplary embodiment of the present disclosure.

FIG. 2 is a view of a panel unit included in a touchscreen device according to an exemplary embodiment of the present disclosure.

Referring to FIG. 2, the panel unit 200 according to the exemplary embodiment includes a substrate 210 and a plurality of electrodes 220 and 230 provided on the substrate 210. Although not shown in FIG. 2, each of the plurality of electrodes 220 and 230 may be electrically connected to a wiring pattern on a circuit board attached to one end of the substrate 210 through wirings and a bonding pad. The circuit board may have a controller integrated circuit mounted thereon so as to detect sensing signals generated in the plurality of electrodes 220 and 230 and may determine whether a touch has occurred, based on the detected sensing signals.

The plurality of electrodes 220 and 230 may be formed on one surface or both surfaces of the substrate 210. Although the plurality of electrodes 220 and 230 are illustrated to have a lozenge- or diamond-shaped pattern in FIG. 2, it will be apparent that the plurality of electrodes 220 and 230 may be formed in a pattern formed of a variety of polygonal shapes such as rectangles and triangles.

The plurality of electrodes 220 and 230 may include first electrodes 220 extending in the x-axial direction, and second electrodes 230 extending in the y-axial direction. The first electrodes 220 and the second electrodes 230 may be provided on both surfaces of the substrate 210 or may be provided on different substrates 210 such that they may intersect with each other. If all of the first electrodes 220 and the second electrodes 230 are provided on one surface of the substrate 210, an insulating layer may be partially formed at intersection points between the first electrodes 220 and the second electrodes 230.

On the regions in which wiring connecting to the plurality of electrodes 220 and 230 is provided other than the region in which the plurality of electrodes 220 and 230 is formed, a printed region may be formed on the region of the substrate 210 so as to hide the wiring typically formed of an opaque metallic material.

A device, which is electrically connected to the plurality of electrodes 220 and 230 to sense a touch, detects a changes in capacitance generated in the plurality of electrodes 220 and 230 by a touch to sense the touch based on the detected changes in capacitance. The first electrodes 220 maybe connected to channels defined as D1 to D8 in the controller integrated circuit to receive predetermined driving signals, and the second electrodes 230 may be connected to channels defined as S1 to S8 to be used by the touch sensing device to detect a sensing signal. The controller integrated circuit may detect a change in mutual-capacitance generated between the first electrodes 220 and the second electrodes 230 as the sensing signal.

Figure 3:
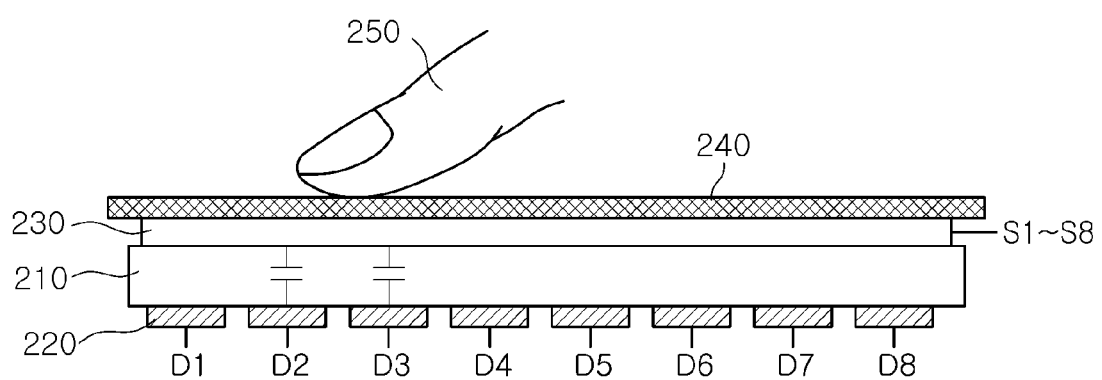
FIG. 3 is a cross-sectional view of a panel unit included in a touchscreen device according to an exemplary embodiment of the present disclosure.

FIG. 3 is a cross-sectional view of a panel unit included in a touchscreen device according to an exemplary embodiment of the present disclosure. FIG. 3 is a cross-sectional view of the panel unit 200 illustrated in FIG. 2 taken on the y-z plane, in which the panel unit 200 may further include a cover lens 240 that is touched, in addition to the substrate 210 and the plurality of sensing electrodes 220 and 230 described above. The cover lens 240 is provided on the second electrodes 230 used in detecting sensing signals, to receive a touch from a touching object 250 such as a finger.

When driving signals are applied to the first electrodes 220 through channels D1 to D8, mutual-capacitance is generated between the first electrodes 220, to which the driving signals are applied, and the second electrodes 230. When the driving signals are applied to the first electrodes 220, changes in the mutual-capacitance occur between the first electrode 220 and the second electrode 230 adjacent to the area with which the touching object 250 comes into contact. The change in mutual-capacitance may be proportional to the overlapped area between the region with which the touching object 250 comes into contact, and the region containing the first electrodes 220, to which the driving signals are applied, and the second electrodes 230. In FIG. 3, the mutual-capacitance generated between the first electrodes 220 connected to channel D2 and D3, respectively, and the second electrodes 230 is influenced by the touching object 250.

Figure 4:
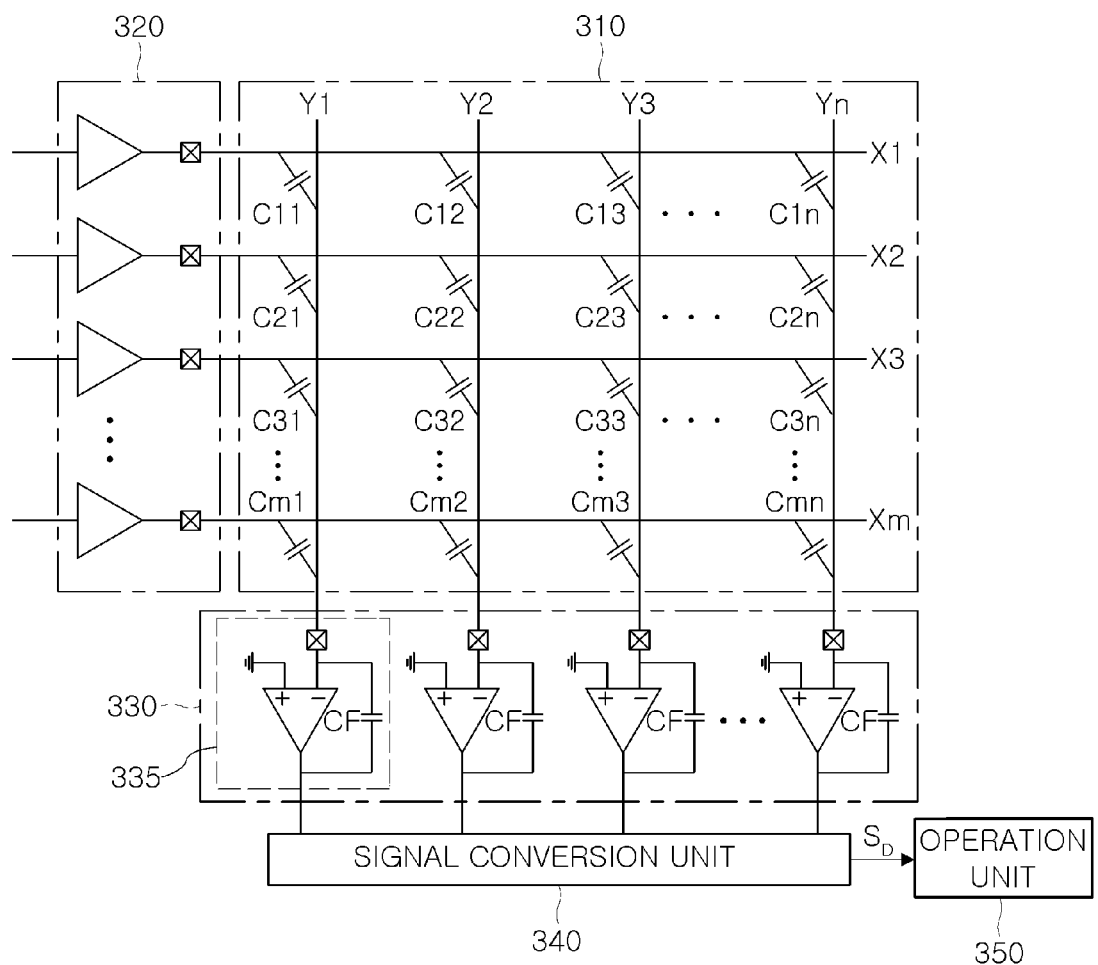
FIG. 4 is a diagram illustrating a touchscreen device according to an exemplary embodiment of the present disclosure.

FIG. 4 is a diagram illustrating a touchscreen device according to an exemplary embodiment of the present disclosure.

Referring to FIG. 4, the touchscreen device according to the exemplary embodiment may include a panel unit 310, a driving circuit unit 320, a sensing circuit unit 330, a signal conversion unit 340, and an operation unit 350. The driving circuit unit 320, the sensing circuit unit 330, the signal conversion unit 340, and the operation unit 350 may be implemented as a single integrated circuit (IC).

The panel unit 310 may include rows of first electrodes (driving electrodes) X1 to Xm extending in a first axial direction (that is, the horizontal direction with respect to FIG. 4), and columns of second electrodes (sensing electrodes) Y1 to Yn extending in a second axial direction (that is, the vertical direction with respect to FIG. 4) crossing the first axial direction. Node capacitors C11 to Cmn are the equivalent representation of mutual capacitance generated in intersections of the first electrodes X1 to Xm and the second electrodes Y1 to Yn.

The driving circuit unit 320 may apply predetermined driving signals to the first electrodes X1 to Xm of the panel unit 310. The driving signals may be square wave signals, sine wave signals, triangle wave signals, or the like, having specific frequency and amplitude. The driving circuit unit 320 includes a plurality of driving signal generation circuits so as to apply driving signals to the first electrodes X1 to Xm simultaneously. Further, the first electrodes X1 to Xm may be grouped so that the driving signals may be applied thereto sequentially.

The sensing circuit unit 330 may detect capacitance of the node capacitors C11 to Cmn from the second electrodes Y1 to Yn so as to output sensing signals $S_A$. The sensing circuit unit 330 may include a plurality of C-V converters 335, each of which has at least one operational amplifier and at least one capacitor and is connected to the respective second electrodes Y1 to Yn.

The C-V converters 335 may convert the capacitance of the node capacitors C11 to Cmn into voltage signals so as to output sensing signals in an analog form. For example, each of the C-V converters 335 may include an integration circuit to integrate capacitance values. The integration circuit may integrate and convert capacitance values into a voltage value to be output.

Although the C-V converter 335 illustrated in FIG. 4 has the configuration in which a capacitor CF is disposed between the inverting input terminal and the output terminal of an operation amplifier, it is apparent that the circuit configuration may be altered. Moreover, while each of the C-V converters 335 illustrated in FIG. 4 is depicted as having one operational amplifier and one capacitor, the C-V converters 335 are not limited thereto.

When driving signals are applied to the first electrodes X1 to Xm, capacitance may be detected simultaneously from the second electrodes, and the number of required C-V converters 335 may be equal to the number of the second electrodes Y1 to Yn, i.e., n.

The signal conversion unit 340 may generate a digital signal $S_D$ from the sensing signals output from the sensing circuit unit 330. For example, the signal converting unit 340 may include a time-to-digital converter (TDC) circuit measuring a time in which the analog signals in the form of voltage output from the sensing circuit unit 330 reach a predetermined reference voltage level to convert the measured time into the digital signal $S_D$, or an analog-to-digital converter (ADC) circuit measuring an amount by which a level of the analog signals output from the sensing circuit unit 330 is changed for a predetermined time to convert the changed amount into the digital signal $S_D$.

The operation unit 350 may determine whether a touch has occurred on the panel unit 310 based on the digital signal $S_D$. The operation unit 350 may determine the number of touches, coordinates of the touches, and the type of gesture of the touches or the like made on the panel unit 310, based on the digital signal $S_D$.

The digital signal $S_D$, which is used by the operation unit 350 to determine whether a touch has occurred, may be data that is a numerical value representing changes in capacitance of the capacitors C11 to Cmn, especially representing a difference between the capacitance with and without a touch. Typically in a capacitive type touchscreen device, a region touched by a conductive object has less capacitance than regions not touched thereby.

Figure 5:
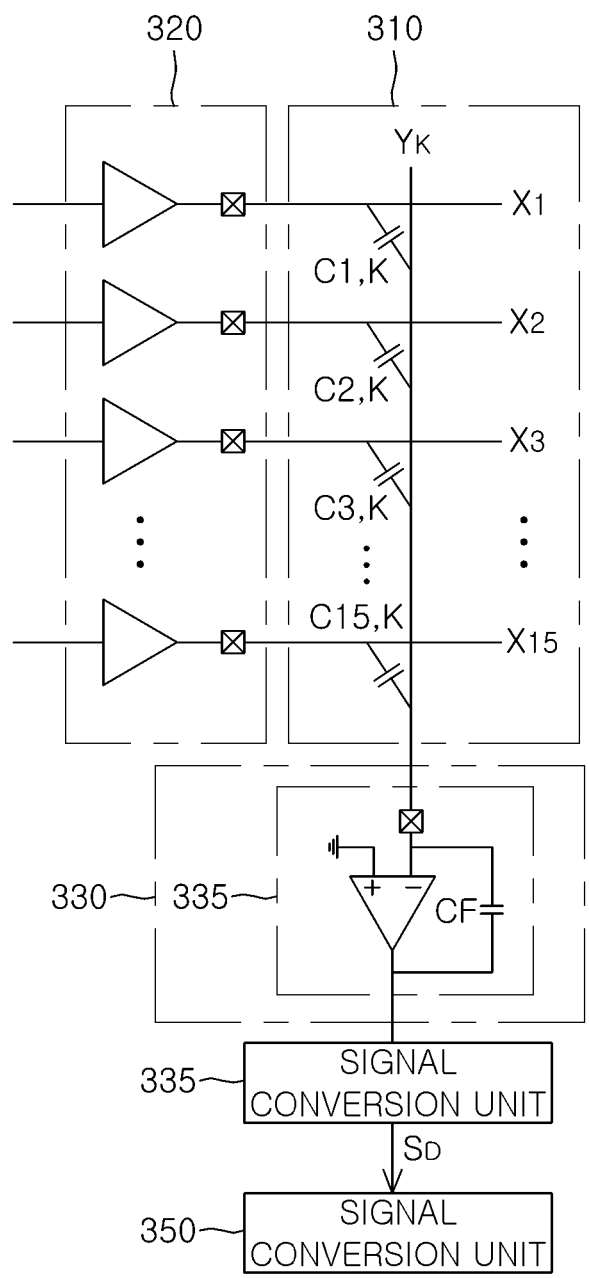
FIG. 5 is a view schematically illustrating a touchscreen device according to the exemplary embodiment in FIG. 4.

FIG. 5 is a diagram schematically illustrating the touchscreen device according to the exemplary embodiment illustrated in FIG. 4, and FIG. 6 is a matrix for illustrating driving signals according to an exemplary embodiment of the present disclosure. Hereinafter, the touchscreen device according to the exemplary embodiment will be described in detail with reference to FIGS. 4 through 6.

The driving circuit unit 320 may apply voltage VDD for elements indicated by "1" and may apply voltage −VDD for elements indicated by "−1" among the elements in the matrix of 15 by 16.

The driving signals associated with the elements in the matrix of 15 by 16 illustrated in FIG. 6 may be applied simultaneously at each of timings T1 to T16. The driving circuit unit 320 may apply the driving signals repeatedly with the timing T1 to T16 as a single period.

The driving signals generated in association with the elements in the first to fifteenth rows may be applied to the first electrodes X1 to X15, respectively, and the driving signals generated in association with the elements in the first to sixteenth columns maybe simultaneously applied to the first to sixteenth of the first electrodes X1 to X16, respectively at each of timings T1 to T16. In the above-description, it is assumed that there are fifteen first electrodes Xt on the panel unit 310, where t is 1 to 15, and the driving circuit unit 320 applies the driving signals to all of the first electrodes X1 to X15 simultaneously. When there a plurality of first electrodes, for example, 150 first electrodes, it may be also possible to group the 150 first electrodes into ten groups in each of which fifteen first electrodes exist, so that the driving circuit unit 320 may apply the driving signals sequentially group by group.

Referring to FIG. 6 which illustrates driving signals, it can be seen that the elements in the first to eighth rows of the first column are 1s, and the elements in the ninth to fifteenth rows of the first column are −1s. If the number of the first electrodes is M, the elements in the first to the (fix(M/2)+1)th rows may be 1s, and the elements in the (fix(M/2)+2)th to the $M^{th}$ rows may be −1. The expression fix(M/2) is a function that drops the portion of the quotient of M/2 to the right of the decimal point, i.e., rounds down M/2 to the nearest integer by truncating any fractional portion of M/2.

It can be seen that the elements in the second to sixteenth columns of the first row represent an example of a pseudo noise (PN) code which is well known, and the elements in the second to sixteenth columns of the second to fifteenth rows include elements shifted by one bit from the elements in the second to sixteenth columns of the first row. The elements in the second to sixteenth columns represent examples of various pseudo noise (PN) codes and it is apparent that the elements in the second to sixteenth columns may be changed in various examples of PN codes.

Furthermore, it can be seen that the elements in the second to sixteenth columns are shifted by one bit to the columns of lower order as the order of the row is increased. However, it is also possible that the elements in the second to sixteenth columns are shifted to the columns of upper order. In addition, although it is assumed that there are fifteen electrodes Xt in FIG. 6, where t is 1 to 15, the matrix in FIG. 6 can be extended to a matrix of M by M+1 when there are M first electrodes.

In the above-description, the matrix illustrated in FIG. 6 is created by adding a new first column to the matrix created according to PN codes. However, exemplary embodiments of the present disclosure are not limited thereto but the matrix illustrated in FIG. 6 may be created by adding a new first column to the matrix created according to Walsh codes.

For example, after creating a Hadamard matrix of M by M according to a Walsh code, the matrix illustrated in FIG. 6 may be modified by adding a new first column in which elements in the first to the (fix(M/2)+1)th rows are 1s and elements in the (fix(M/2)+2)th to the $M^{th}$ rows are −1.

When the driving circuit unit 320 applies driving signals to a plurality of first electrodes according to a matrix, the sensing circuit unit 330 detects capacitance generated in intersections of the first electrodes X1 to X15 and the second electrodes Yk so as to output sensing signals Sk, which may be expressed by Mathematical Expression 1 below, where the term Ct, k denotes mutual-capacitance generated in intersections between the first electrodes Xt and the second electrodes Yk and the term Dt denotes driving signals applied to the first electrodes Xt.

$$Sk=\Sigma_{t=1}^{15} Ct,k*Dt \qquad \text{[Mathematical Expression 1]}$$

In the case that there are M first electrodes, Mathematical Expression 1 may be expanded as Mathematical Expression 2 below:

$$Sk=\Sigma_{t=1}^{m} Ct,k*Dt \qquad \text{[Mathematical Expression 2]}$$

Then, the operation unit 350 may determine whether a touch has occurred, based on sensing signals Sk. The operation unit 350 may calculate correlation values $Corr_{t,k}$ by correlation operation between the sensing signals Sk and the driving signals. More specifically, the operation unit 350 may calculate the correlation values by performing a correlation operation between the sensing signals Sk acquired during a single period and the driving signals acquired during a single period.

However, the driving signals illustrated in FIG. 6 are generated according to a PN code such that elements in rows are not completely orthogonal to one another. Therefore, a cross correlation values exists within the calculated correlation value, and thus a touch cannot be accurately determined.

FIG. 7 is correlation data of the correlation values created when the two matrices illustrated in FIG. 6 are correlated. Referring to FIG. 7, it can be seen that elements indicated by −2, i.e., cross correlation values are created as well as the elements indicated by 16, i.e., auto correlation values. It can be seen that the cross correlation values are created since the elements in the rows are not completely orthogonal.

Figure 8:
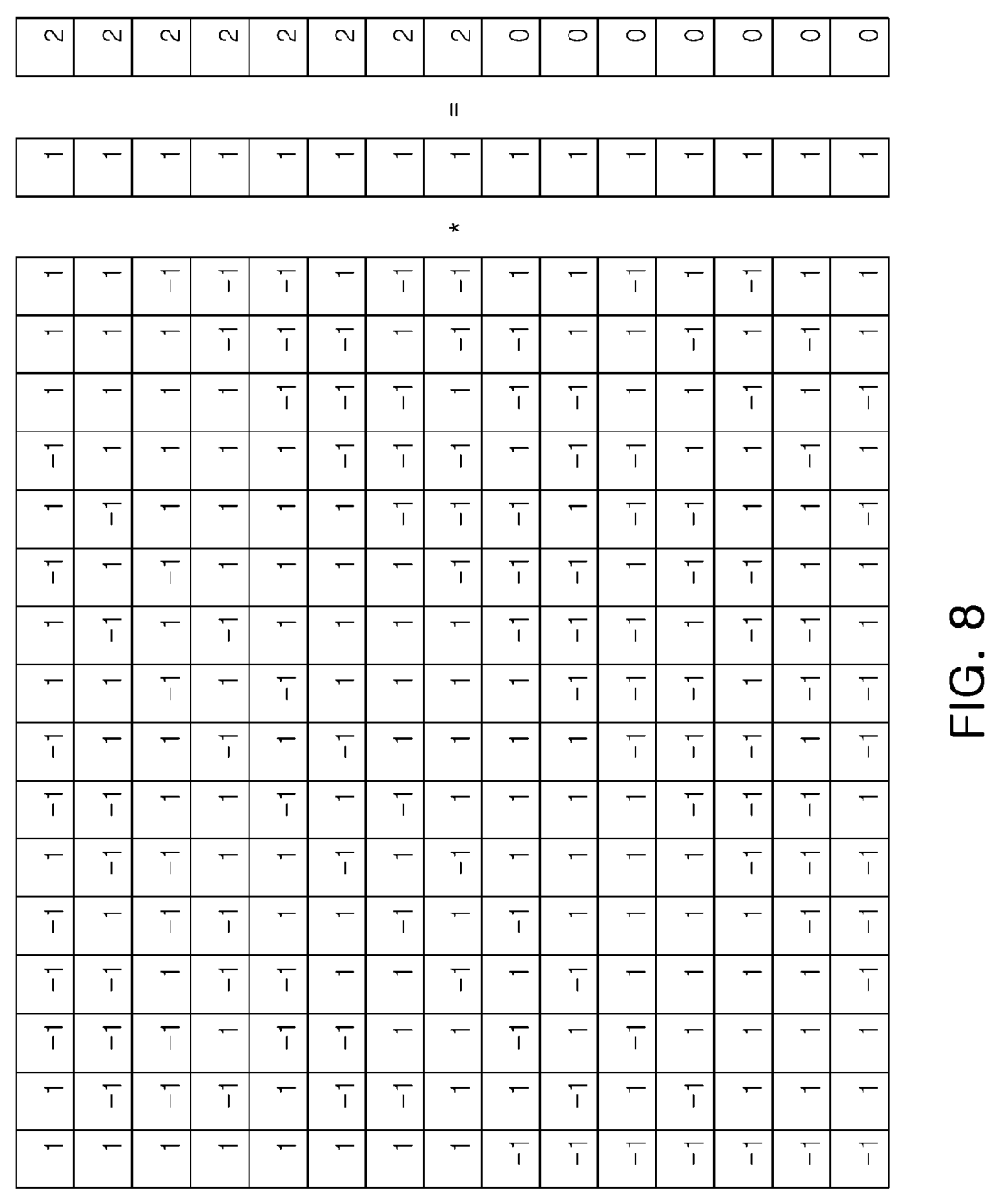
Figure 9:
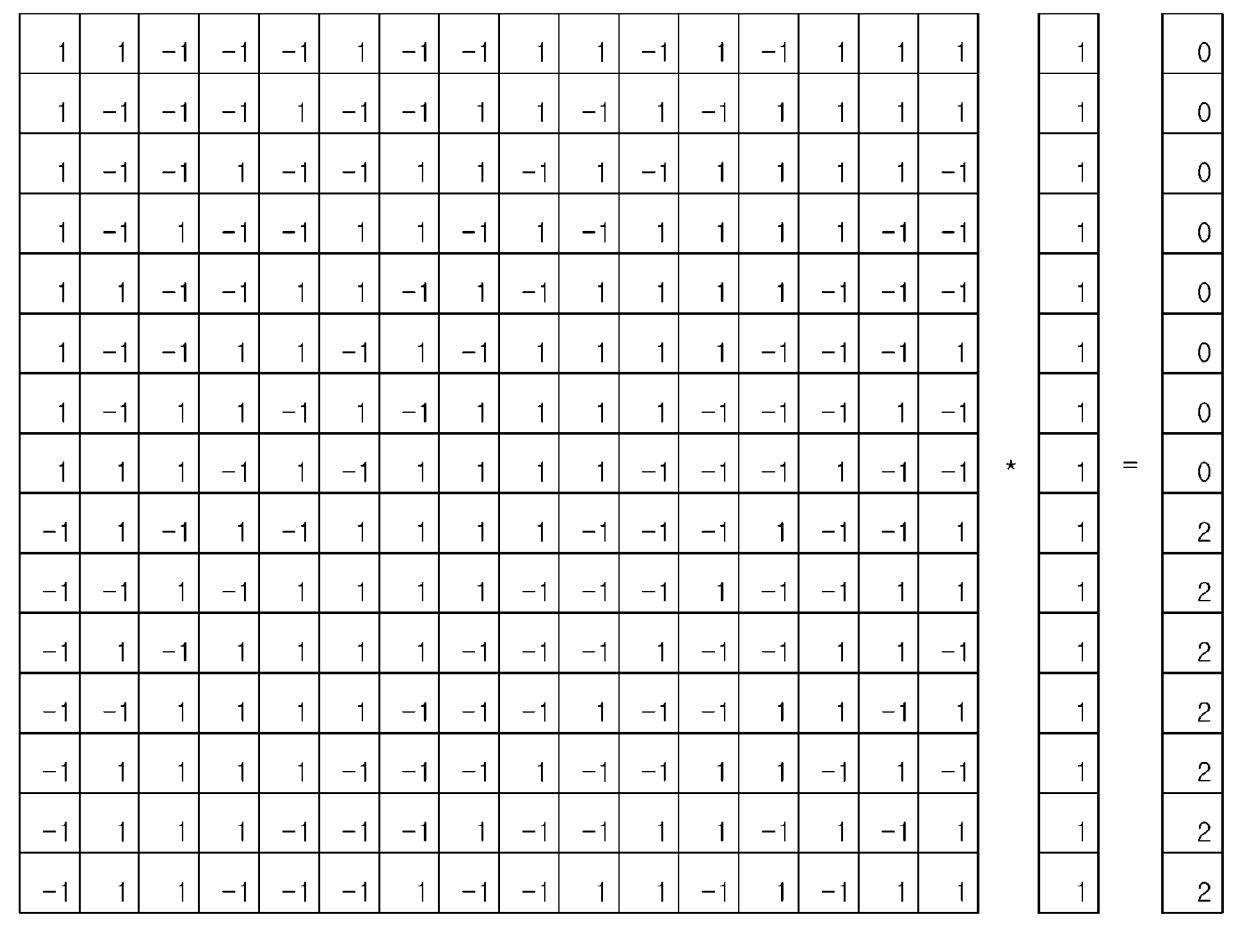

According to the exemplary embodiment, the operation unit 350 may calculate the cross correlation values to correct them. FIGS. 8 and 9 are diagrams for illustrating a method of correcting cross correlation values according to an exemplary embodiment of the present disclosure.

Referring to FIG. 8, by the operation value [2 2 2 2 2 2 2 2 0 0 0 0 0 0 0] created by a multiple of the driving signals illustrated in FIG. 6 and a column vector such as [1 1 1 1 1 1 1 1 1 1 1 1 1 1 1], the cross correlation values, i.e., the elements indicated by −2 existing in the ninth to fifteenth columns of the first to eighth rows of the cross correlation data illustrated in FIG. 7 are corrected. If there are M first electrodes Xt, all of the M elements of the column vector may be 1s, such as [1 1 1 1 1 1 1 1 1 1 1 1 1 1 1].

Further, referring to FIG. 9, by the operation value [0 0 0 0 0 0 0 2 2 2 2 2 2 2] created by a multiple of the driving signals illustrated in FIG. 6 and a column vector such as [−1 1 1 1 1 1 1 1 1 1 1 1 1 1 1], the operation unit 350 may correct the cross correlation values, i.e., the elements indicated by −2 existing the first to eighth columns of the ninth to fifteenth rows of the cross correlation data illustrated in FIG. 7. If there are M first electrodes Xt, the element in the first row may be −1 and the rest of (M−1) elements of the column vector may be 1s, such as [−1 1 1 1 1 1 1 1 1 1 1 1 1 1 1].

Generally speaking, if there are M first electrodes Xt, the operation unit 350 may calculate a first correction value according to a multiple of the sensing signals Sk during a single period and M colum vectors having elements indicated by 1s, so that it corrects the cross correlation values existing the (fix(M/2)+2)th to the $M^{th}$ columns of the first to the (fix(M/2)+1)th rows in a correlation values matrix. In addition, according to a multiple of the sensing signals Sk during a single period and a vector having the element indicated by −1 in the first column and the elements indicated by 1 in the second to the $M^{th}$ columns, the correlation values existing in the first to the (fix(M/2)+1)th column of the (fix(M/2)+2)th to the $M^{th}$ rows are corrected.

As set forth above, according to exemplary embodiments of the present disclosure, driving signals are applied to driving electrodes simultaneously, so that a touch response speed can be improved.

While exemplary embodiments have been shown and described above, it will be apparent to those skilled in the art that modifications and variations could be made without departing from the spirit and scope of the present disclosure as defined by the appended claims.

What is claimed is:

1. A touchscreen device, comprising:
a panel unit including a plurality of first electrodes and a plurality of second electrodes;
a driving circuit unit simultaneously applying driving signals to M first electrodes among the first electrodes, where M is a natural number equal to or greater than two;
a sensing circuit unit detecting capacitance generated in intersections between the first electrodes and the second electrodes so as to output sensing signals; and
an operation unit determining whether a touch has occurred, based on the sensing signals,
wherein the driving circuit unit generates the driving signals according to an M by N matrix, where N is a natural number equal to or greater than two,
wherein elements in first to (fix(M/2)+1) rows of a first column are 1s, and elements in (fix(M/2)+2) to $M^{th}$ rows of the first column are −1s, and
wherein elements in second to $N^{th}$ columns of first to $M^{th}$ rows are created according to at least one of a pseudo noise (PN) code and a Walsh code, where fix(M/2) is a function that rounds down M/2 to the nearest integer by truncating any fractional portion of M/2.

2. The touchscreen device of claim 1, wherein N=M+1 is met.

3. The touchscreen device of claim 1, wherein the elements in the second to $N^{th}$ columns of the first row of the matrix are created according to a PN code, and the elements in the second to $N^{th}$ columns of the second to $M^{th}$ rows of the matrix are created by shifting the elements in the second to $N^{th}$ columns of the first row of the matrix by one bit for every row.

4. The touchscreen device of claim 1, wherein the elements in the second to $N^{th}$ columns of the first to $M^{th}$ rows of the matrix are equal to elements of a Hadamard matrix created according to a Walsh code.

5. The touchscreen device of claim 1, wherein the driving circuit unit simultaneously applies driving signals generated according to M rows of the matrix to M first electrodes among the first electrodes.

6. The touchscreen device of claim 1, wherein the driving circuit unit applies driving signals generated according to N columns of the matrix at each of N timings.

7. The touchscreen device of claim 1, wherein the sensing circuit unit outputs the sensing signals by $$Sk=\Sigma_{t=1}^{m} Ct,k*Dt$$

where Sk denotes a sensing signal, Ct,k denotes capacitance generated in intersections between first electrodes Xt and second electrodes Yk, and Dt denotes a driving signal applied to first electrodes Xt.

8. The touchscreen device of claim 1, wherein the operation unit determines whether a touch has occurred, based on correlation values calculated by performing a correlation operation on the sensing signals acquired during a single period of the driving signals and the matrix.

9. The touchscreen device of claim 8, wherein the operation unit corrects a cross correlation values existing in the correlation values by multiplying the sensing signals acquired during a single period of the driving signals by a column vector.

10. The touchscreen device of claim 9, wherein the column vector includes a first column vector and a second column vector of (M+1) rows, wherein all of elements in the first column vector are 1, an element in a first row of the second column vector is −1, and elements in the rest of rows of the second column vector are 1.

11. The touchscreen device of claim 10, wherein the operation unit calculates a first correction value by multiplying sensing signals obtained during a single period of the driving signals by the first column vector and calculates a second correction value by multiplying the sensing signals obtained during a single period of the driving signals by the second column vector.

12. The touchscreen device of claim 11, wherein the operation unit corrects the cross correlation values existing in the correlation values according to first and second correction values.

13. The touchscreen device of claim 1, wherein the driving circuit unit applies positive driving voltage when the elements in the matrix are 1 and generates negative driving voltage when the elements in the matrix are −1.

14. A method of sensing a touch, comprising:
simultaneously applying driving signals to M first electrodes among the first electrodes, where M is a natural number equal to or greater than two;
obtaining sensing signals by detecting capacitance generated in intersections between the first electrodes and second electrodes; and
determining whether a touch has occurred by calculating correlation values between the sensing signals and the driving signals,
wherein the applying of the driving signals includes applying the driving signals generated according to an M by N matrix, where N is a natural number equal to or greater than two,
wherein elements in first to (fix(M/2)+1) rows of a first column are 1s, and elements in (fix(M/2)+2) to $M^{th}$ rows of the first column are −1s, and
wherein elements in second to $N^{th}$ columns of first to $M^{th}$ rows are created according to at least one of a PN code and a Walsh code, where fix(M/2) is a function that rounds down M/2 to the nearest integer by truncating any fractional portion of M/2.

15. The method of claim 14, wherein N=M+1 is met.

16. The method of claim 14, wherein the elements in the second to $N^{th}$ columns of the first row of the matrix are created according to a PN code, and the elements in the second to $N^{th}$ columns of the second to $M^{th}$ rows of the matrix are created by shifting the elements in the second to $N^{th}$ columns of the first row of the matrix by one bit for every row.

17. The method of claim 14, wherein the elements in the second to $N^{th}$ columns of the first to $M^{th}$ rows of the matrix are equal to elements of a Hadamard matrix created according to a Walsh code.

18. The method of claim 14, wherein the applying of the driving signals includes simultaneously applying driving signals generated according to M rows of the matrix to M first electrodes among the first electrodes.

19. The method of claim 14, wherein the applying of the driving signals includes applying driving signals generated according to N columns of the matrix at each of N timings.

20. The method of claim 14, wherein the obtaining of the sensing signals includes obtaining the sensing signals by $$Sk=\sum_{t=1}^{m}Ct,k*Dt$$

where Sk denotes a sensing signal, Ct,k denotes capacitance generated in intersections between first electrodes Xt and second electrodes Yk, and Dt denotes a driving signal applied to first electrodes Xt.

21. The method of claim 14, wherein the determining whether a touch has occurred includes determining whether a touch has occurred, based on correlation values calculated by performing a correlation operation on the sensing signals acquired during a single period of the driving signals and the matrix.

22. The method of claim 21, wherein the determining whether a touch has occurred includes correcting a cross correlation values existing in the correlation values by multiplying the sensing signals acquired during a single period of the driving signals by a column vector.

23. The method of claim 22, wherein the column vector includes a first column vector and a second column vector of (M+1) rows, wherein all of elements in the first column vector are 1, and an element in a first row of the second column vector is −1 and elements in the rest of rows of the second column vector are 1.

24. The method of claim 23, wherein the determining whether a touch has occurred includes calculating a first correction value by multiplying sensing signals obtained during a single period of the driving signals by the first column vector and calculating a second correction value by multiplying the sensing signals obtained during a single period of the driving signals by the second column vector.

25. The method of claim 24, wherein the determining whether a touch has occurred includes correcting the cross correlation values existing in the correlation values according to first and second correction values.

26. The method of claim 14, wherein the applying of the driving signals includes applying positive driving voltage when the elements in the matrix are 1 and generating negative driving voltage when the elements in the matrix are −1.

* * * * *